United States Patent [19]

Nahmias et al.

[11] Patent Number: 5,916,951
[45] Date of Patent: Jun. 29, 1999

[54] PROCESS FOR PRODUCING A VULCANIZABLE RUBBER COMPOSITION WITH SILICA-BASED REINFORCING FILLER

[75] Inventors: Marco Nahmias, Milan, Italy; Robert Schrafft; Christa Joseph, both of Bad-Konig, Germany

[73] Assignee: Pirelli Coordinamento Pneumatici S.p.A., Milan, Italy

[21] Appl. No.: 08/951,168

[22] Filed: Oct. 15, 1997

Related U.S. Application Data

[63] Continuation of application No. 08/607,077, Feb. 26, 1996.

[30] Foreign Application Priority Data

Feb. 24, 1995 [IT] Italy .................. MI95A0359

[51] Int. Cl.⁶ ........................................ C08K 3/00
[52] U.S. Cl. .......................... 524/492; 524/493
[58] Field of Search ................... 524/492, 493

[56] References Cited

U.S. PATENT DOCUMENTS

5,227,425  7/1993  Rauline .................................. 524/493

Primary Examiner—Edward J. Cain
Attorney, Agent, or Firm—Stevens, Davis, Miller & Mosher, L.L.P.

[57] ABSTRACT

In a process for producing a vulcanizable rubber composition containing silica and having a low content of carbon black, at least a silica-based reinforcing filler and ad least a silane-based coupling agent are added to and intimately mixed with other ingredients of the composition in subsequent steps, at a temperature of from 165° and 180° C. and between 1100 and 160° C. respectively. The rubber composition so obtained has an improved silica dispersion, constant physico-mechanical characteristics and a better drawability and is particularly suitable for the manufacture of treads for tires with low rolling resistance.

7 Claims, 1 Drawing Sheet

PROCESS FOR PRODUCING A VULCANIZABLE RUBBER COMPOSITION WITH SILICA-BASED REINFORCING FILLER

This is a continuation of application Ser. No. 08/607,077, filed Feb. 26, 1996.

DESCRIPTION

In its more general aspect, the present invention relates to a vulcanizable rubber composition of the type comprising a low carbon black content and incorporating a silica-based reinforcing filler—partly or fully replacing carbon black—in a cross-linkable unsaturated chain polymer base.

More particularly, this invention relates to a process for producing a composition of the aforementioned type, as well as to a tread obtainable from said composition.

Throughout the following description and the subsequent claims, with the term: cross-linkable unsaturated chain polymer base, it is intended to indicate any non cross-linked polymer, either natural or synthetic, capable of assuming all the physico-chemical and mechanical characteristics typical of elastomers as a result of a cross-linking (vulcanization) with sulphur-based systems. As is known, in the sector of tire manufacture, the main object of an increasing part of the research is to reduce as much as possible the rolling resistance of tires.

For this reason, it has been proposed in the art the use of rubber compositions having a low content of carbon black in the manufacture of tire treads.

In these rubber compositions, carbon black is partly or fully replaced by inorganic, so-called "light" reinforcing fillers, such as gypsum, talc, kaolin, bentonite, titanium dioxide, various silicates and especially silica.

However, as the silica has a poor affinity with the polymer matrix of the composition, a suitable coupling agent, capable of chemically bonding the silica to the polymer matrix, is usually incorporated in the latter.

So, for instance, in U.S. Pat. No. 5,227,425 rubber compositions are described for treads with low rolling resistance, obtained by mixing a polymer base including a copolymer of a conjugated diene with a vinyl aromatic compound having a content of vinyl groups of from 5 to 50%, with high quantities of silica as filler and a silane-based coupling agent.

Similarly, in European patent application EP-A-0 447 066, compositions are described for treads with low rolling resistance, in which an essential component for chemically bonding the silica to the polymer base is a silane-based coupling agent.

According to the constant teaching of the prior art and the indications constantly provided by the manufacturers of said coupling agents (see, for instance, the publication: "SILICA BASED TREAD COMPOUNDS: BACKGROUND AND PERFORMANCE", p. 14, tab. IV, published by Degussa on occasion of the conference TYRETECH '93 held in Basel on Oct. 28–29, 1993), the silica and the coupling agent should be added to and incorporated into the composition at the same time, to achieve the required effects of chemically bonding the silica to the coupling agent, during the preparation of the composition, and to the polymer matrix during the subsequent vulcanization operations.

However, the need of simultaneously incorporating silica and coupling agent into the composition has set a severe limitation to the maximum temperature attainable during the mixing and mechanical working operations of the composition.

During the preparation of the composition, in fact, the temperature of the same must not exceed 160°–165° C., if an irreversible thermal degradation of the coupling agent is to be avoided.

But the compliance with the above temperature constraint involves a marked reduction in the very mechanical activity of mixing which is of the essential for an optimum dispersion of the silica throughout the polymer matrix.

The ensuing insufficient silica dispersion into the composition causes in its turn a number of drawbacks substantially due to the extreme variability and dishomogeneity of the physico-mechanical characteristics of the rubber composition from zone to zone of the same.

More particularly, a marked drawing difficulty and a variability in size of the tread obtained from the rubber compositions so produced have been observed in the various attempts of producing treads from the above compositions.

To all these drawbacks, another non negligible one has to be added, namely the reduced production capacity of the drawing apparatuses used for the production of treads.

Actually, with the rubber compositions comprising a high silica content of the known art, one cannot maintain the drawing speed usually employed for conventional rubber compositions, but has to go down to a value such as to assure that the composition coming out of the draw-bench has a temperature of about 120° C.

This is obtained with a drawing speed equal to about 50% of the usual speeds.

At higher speeds, in fact, porous zones have been found in the tread which markedly jeopardize the stability of the dimensional characteristics thereof.

The origin of such zones is thought to be essentially due to the rapid evaporation of silica-bound water which is contained in the rubber composition as a consequence of the high temperature caused by the high drawing speed.

Obviously, the higher the drawing speed—and therefore the temperature reached by the composition—more evident is this negative phenomenon.

A drastic drop in the hourly production capacity of the plant ensues, which markedly affects production times and costs.

The technical problem underlying the present invention is that of providing a vulcanizable rubber composition incorporating at least a silica-based reinforcing filler, having both an improved silica dispersion and improved physico-mechanical and workability characteristics.

According to a first aspect, the invention therefore relates to a process for producing a vulcanizable rubber composition having a silica-based reinforcing filler, characterized in that it comprises the following steps:

throughly mixing, at a temperature of from 165° to 180° C. and in substantial absence of silica coupling agents, a cross-linkable unsaturated chain polymer base, at least a silica-based reinforcing filler and optionally one or more non cross-linking ingredients;

adding to the rubber composition thus obtained at least a silane-based silica coupling agent and optionally a second portion of said silica-based reinforcing filler;

submitting to intimate mixing the resulting rubber composition at a temperature of from 110° to 160° C.;

adding to and homogeneously dispersing throughout said rubber composition a suitable vulcanizing agent at a temperature lower than the vulcanization temperature.

In the following description and in the appended claims, the term: silica-based reinforcing filler is intended to indicate a reinforcing filler based on silicon dioxide (silica), silicates and mixtures thereof, having a surface area, as measured according to the BET method, of from 100 and 300 m$^2$/g.

With the sole purpose of simplifying the present description, the silica-based fillers object of the invention are indicated in the following by the term: silica.

According to the invention, it is particularly advantageous to incorporate into the rubber composition 10 to 80 parts by weight of silica for each 100 parts by weight of polymer base.

In fact, when the rubber composition incorporates such a quantity of silica optimum results have been achieved by the tires obtained therefrom, as concerns its mechanical characteristics, reduction of rolling resistance, road holding, in particular adherence on wet ground.

As will be more readily apparent in the following, in fact, it has been found that when the quantity of silica is less than 10 parts by weight for each 100 parts of polymer base, its reinforcing activity on the rubber composition and on the products obtainable therefrom is reduced, while between 60 and 80 parts by weight the workability characteristics of the rubber composition begin to drop drastically and remarkably, to become lastly no longer acceptable above 80 parts.

Among the polymer bases useful for the purposes of the invention, unsaturated chain polymers or copolymers obtained by polymerization of conjugated dienes and/or aliphatic or aromatic vinyl monomers are preferred.

More particularly, the polymer bases object of the invention may be selected from the group comprising: natural rubber, 1,4-cis polybutadiene, polychloroprene, 1,4-cis polyisoprene, optionally halogenated isoprene-isobutene copolymers, butadiene-acrylonitrile, styrene-butadiene and styrene-butadiene-isoprene terpolymers, either prepared in solution or in emulsion, ethylene-propylene-diene terpolymers.

According to the invention, such polymer bases may be used either individually or mixed with one another, according to the desired characteristics of the finished product.

According to a preferred embodiment of the invention, the non link-crossing ingredients needed to provide the rubber composition with the necessary mechanical and workability characteristics are added to and incorporated into the polymer base during the first mixing step.

Such ingredients, known per se, are selected from the group comprising reinforcing fillers, such as, for instance, carbon black, plasticizers, working adjuvants, antioxidants, age-retarding agents, etc.

Each one of such ingredients is also chosen in amounts and proportions which may be easily determined by those skilled in the art, in order to achieve optimal values of the above characteristics.

Besides, depending upon the amount of silica to be incorporated into the rubber composition, the silica may be added to the polymer base in two or more portions, the last of which may be dosed simultaneously to the coupling agent, as shall appear more clearly in the following.

In fact, it has been noticed that when the quantity of silica to be incorporated into the rubber composition exceeds 50 parts by weight for each 100 parts of polymer base, the addition and the intimate mixing of the silica in two or more separate steps markedly improves the dispersion of the same in the polymer base.

According to the invention, it has also been surprisingly found that the required effects of chemical bonding of the silica to the coupling agent during the preparation of the rubber composition and to the polymer base during vulcanization, may be achieved by separately incorporating these components into the rubber composition.

Contrary to the constant teaching of prior art, in fact, it has been observed that the incorporation at different times into the rubber composition of the coupling agent and of all of the silica, or at least of a substantial part thereof, does not jeopardize neither the possibility for silica and coupling agent to react, nor the stability of the bonds that form between silica, coupling agent and polymer matrix.

To the contrary, the process object of the present invention allows to achieve important and unexpected advantages compared to what the prior art would have let to foresee.

According to a preferred embodiment of the invention, all the silica or at least a substantial part thereof, is incorporated into the rubber composition without any coupling agent and is throughly mixed with the other ingredients of said rubber composition at a temperature of from 165° and 180° C., preferably of about 175° C., much higher than that allowed till now by the processes of the prior art.

Advantageously, the aforementioned high mixing temperature may be reached in an easy and rapid way by mixing the polymer base, the silica and the optional non-crossing ingredients in common mixing apparatuses known to those skilled in the art by the name "Banbury".

In such apparatuses, in fact, the rubber composition which is being prepared is subject to a mechanical working which, on account of its marked viscoelastic characteristics, causes its temperature to rise quickly within the range of the above values.

According to the invention, the possibility of increasing the mechanical work which the rubber composition undergoes allows, on the one hand, to homogeneously disperse the silica throughout the rubber composition, and, on the other hand, to remove from the latter a substantial part of the water bound to the silica.

As concerns the humidity content of the rubber composition, it has been observed in particular that it can be easily reduced to a value equal or smaller than about 80% of the value found in the rubber compositions prepared according to the prior art, so as to substantially reduce the creation of porous structures in the subsequent working steps of the rubber composition.

In the course of repeated tests carried out on the rubber compositions object of the invention, it has also been noticed that the silica is dispersed throughout the rubber composition and in semi-finished products (for instance treads) or finished products (for instance tires) obtainable therefrom, in an extremely homogeneous way, definable, as will better appear in the following, by means of a specific dispersion index.

With the mixing apparatuses of the above type, one has the further advantage of achieving the above advantageous characteristics within an interval of time of from 1.5 to 5 minutes, preferably about 3 minutes.

Clearly, the time necessary to complete this first mixing step may vary within the above value range according to the actual formulation of the rubber composition and to the structural and functional characteristics of the mixing apparatus chosen.

According to the invention, after having obtained a homogeneous dispersion of the silica throughout the rubber composition, accompanied by a suitable reduction in its water content, a suitable coupling agent, capable of chemically reacting with the silica and of binding the latter to the polymer base in the following vulcanization step thereof, is added to the rubber composition.

To this end, suitable coupling agents comprise at least a functional group capable of reacting with the reactive groups (hydroxyl, silyl, etc.) present on the silica's external surface at the pressure and temperature conditions existing during the preparation steps of the rubber composition, and at least a functional group capable of reacting with the polymer base at the pressure and temperature conditions existing during the vulcanization of the rubber composition.

For the purposes of this invention, a particularly suitable coupling agent is a silane-based agent which has the following structural formula:

wherein:
R is an alkyl or alkoxy group comprising 1 to 4 carbon atoms or a chlorine atom, n is an integer of from 1 to 6, and X is $-Si_m-C_nH_{2n}-Si-(R)_3$, a nitroso group, a mercapto group, an amino group, an epoxy group, a vinyl group, an imido group, one atom of chlorine, one or more atoms of sulphur, or a SmY group, wherein Y is selected from among the following functional groups:

wherein m and n are an integer of from 1 to 6, and R is an alkyl or an alkoxy group comprising 1 to 4 carbon atoms or a chlorine atom.

Particularly suitable coupling agents having the above formula (I) are:
bis(3-triethoxysilyl-propyl)tetrasulfide,
bis(2-triethoxysilyl-ethyl)tetrasulfide,
bis(3-trimethoxysilyl-propyl)tetrasulfide,
bis(2-trimethoxysilyl-ethyl)tetrasulfide,
3-mercaptopropyl-trimethoxysilane,
3-mercaptopropyl-triethoxysilane,
2-mercaptoethyl-trimethoxysilane,
2-mercaptoethyl-triethoxysilane,
3-nitropropyl-trimethoxysilane,
3-nitropropyl-triethoxysilane,
3-chloropropyl-trimethoxysilane,
3-chloropropyl-triethoxysilane,
2-chloroethyl-triniethoxysilane,
2-chloroethyl-triethoxysilane,
3-trimethoxysilylpropyl-N,N-dimethylthiocarbamoyl tetrasulfide,
3-triethoxysilylpropyl-N,N-dimethylthiocarbamoyl tetrasulfide,
2-triethoxysilyl-N,N-dimethylthiocarbamoyl tetrasulfide,
3-trimethoxysilylpropyl-benzothiazole tetrasulfide,
3-triethoxysilylpropyl-benzothiazole tetrasulfide,
3-triethoxysilylpropyl-methacrylate monosulfide,
3-trimethoxysilylpropyl-methacrilate monosulfide,
and the like.

Particularly preferred among them is bis(3-triethoxysilyl-propyl)tetrasulfide, marketed by DEGUSSA under the trade name Si69.

The silica coupling agent is incorporated into the rubber composition by submitting the latter to intimate mixing according to the method described hereinabove with reference to the preceding step of silica incorporation, but at a temperature of from a minimum value of 110° up to a maximum value ranging from 140° to 160° C., according to the quantity of silica simultaneously added together with the coupling agent to the rubber composition.

As stressed above, in fact, the silica may be either fully incorporated into the rubber composition separately from the coupling agent, in one or two distinct steps, or partly added together with said coupling agent during the mixing step of the latter.

In this regard, it has been observed that the above advantageous effects of optimal dispersion and surface activation of the silica, as well as of removal of a substantial part of the water bound to the same, may be also achieved by simultaneously adding to the rubber composition the coupling agent together with a portion of the silica equal to no more that ⅓ or the total weight of the silica that has to be incorporated into the polymer base.

In this case, the temperature of the rubber composition is kept during the mixing step between a minimum value close to 140° C. (in substantial absence of silica) and a maximum value close to 160° C. when the above maximum quantity of the silica (no more than ⅓ of the total weight) is used.

According to the invention, it has surprisingly been found that the silica and the coupling agent, besides reacting with one another to a substantially complete extent, even though added to the rubber composition at different times, are also capable of chemically binding to one another at temperatures lower that those considered as optimal (160–165° C.).

While this phenomenon has not been fully clarified, the preceding mixing step of silica, polymer base and optional other non cross-linking additives, is thought to be capable to "activate" in some way the outer surface of the silica and/or causing a greater number of hydroxyl or silyl groups to become somehow available to react with the coupling agent.

Thanks to this higher reactivity of the silica, it has also been observed that a mixing time of from 0.5 and 1.5 minutes is sufficient to allow both the incorporation of the coupling agent into the rubber composition and the reaction between the latter and the silica.

For the purposes of this invention, and independently from the method chosen to add the silica (separately, in one or several steps, or at least partly with the coupling agent), the silane-based coupling agent is added to the rubber composition in a quantity of from 4 to 15 parts by weight per each 100 parts by weight of the silica and preferably between 8 and 10 parts by weight per each 100 parts by weight of the silica.

In fact, it has been observed that below 4 parts by weight the coupling agent is not able to react with all the functional groups available on the outer surface of the silica, while above 15 parts by weight (for the type of silica indicated), no significant improvements in the binding activity are noticed.

According to a preferred embodiment of the invention, the step of incorporating and homogeneously dispersing the silica and the step of incorporating and reacting the silica and the coupling agent, are carried out at different times and/or in different apparatuses, after having discharged the rubber composition and let it cool upon completion of each step.

As an alternative, one may also perform the aforementioned mixing steps in the same mixing apparatus (Banbury or double-screw drawing bench), taking care however to lower the temperature of the rubber composition being worked within the range of the aforementioned values (110°–160° C.), before starting the incorporation step of the coupling agent.

Once the coupling agent has been homogeneously incorporated into the rubber composition, the latter is made vulcanizable by adding and incorporating therein a suitable vulcanizing agent, optionally and preferably accompanied by suitable vulcanization activators and accelerators.

If the polymer base is chosen from among the preferred cross-linkable unsaturated chain polymers, the vulcanizing agent of most advantageous use is sulphur, or sulphur-containing molecules (sulphur donors), with accelerators and activators known to those skilled in the art.

Among the vulcanization activators, zinc stearate, directly formed in the rubber composition upon addition of zinc oxide and stearic acid, is preferred.

The vulcanizing agent, with the possible accelerators and activators, is incorporated into the rubber composition by submitting the latter to an intimate mixing according to the method specified above with reference to the preceding steps of incorporation of the silica and its coupling agent.

In order to avoid an early and unwanted vulcanization of IS the rubber composition, its temperature shall be kept at values lower than the vulcanization temperature, and preferably within a range of values of from 100° to 110° C.

For a better control of the temperature, it is preferable in this case, before adding the vulcanizing agent, to discharge the rubber composition from the apparatus after the incorporation of the coupling agent and to let it cool, if necessary.

In this step, it has been found that a mixing time of from 2.5 to 4 minutes is sufficient to achieve a homogeneous dispersion of the vulcanization system (vulcanizing agent, accelerators and activators) throughout the rubber composition.

In a further embodiment of the process object of the present invention, the vulcanization activators, for instance zinc oxide and stearic acid, may be incorporated into the rubber composition during the first one of the above mixing steps, together with the silica, the polymer base and the other non cross-linking agents.

According to a further and advantageous embodiment of the invention, it is also possible to reduce the overall number of process steps by simultaneously adding the coupling agent, the vulcanizing agents and the above accelerators to the rubber composition.

According to a further aspect of this invention, a vulcanizable rubber composition with a silica-based reinforcing filler and low carbon black content is provided by means of said process, which rubber composition is particularly suitable for the manufacture of tire treads, in particular with low rolling resistance.

According to the invention, the above rubber composition comprises at least a cross-linkable unsaturated chain polymer base and at least a silica-based reinforcing filler homogeneously dispersed throughout the same.

The rubber composition object of the invention preferably comprises 10 to 80 parts by weight of silica per each 100 parts by weight of polymer base.

Among the polymer bases useful for the purposes of this invention, unsaturated chain polymers or copolymers obtained by polymerization of conjugated dienes and/or aliphatic or aromatic vinyl monomers are preferred.

More particularly, the polymer bases object of this invention may be selected from the group comprising: natural ribber, 1,4-cis polybutadiene, polychloroprene, 1,4-cis polyisoprene, optionally halogenated isoprene-isobutene copolymers, butadiene-acrylonitrile, styrene-butadiene and styrene-butadiene-isoprene terpolymers, either prepared in solution or in emulsion, ethylenepropylene-diene terpolymers and mixtures thereof.

Solely by way of non limitative example, a typical composition of a rubber composition according to the invention is given in the following (parts by weight):

| | |
|---|---|
| polymer base | 100 |
| carbon black | 0–80 |
| silica | 10–80 |
| coupling agent | 4–15% of silica |
| ZnO | 1–3 |
| stearic acid | 0–3 |
| antioxidants | 1–3 |
| antifatigue agents | 0.5–3 |
| sulfur or sulfur donors | 0.5–3 |
| accelerators | 0.5–3 |
| plasticizers | 3–30 |

Thanks to the aforementioned high dispersion degree, the rubber composition of the invention is not only provided with homogeneous characteristics, but also allows to obtain tire treads having the desired low value of rolling resistance.

Thanks to its constant characteristics and its low humidity content, the rubber composition object of the invention also possesses improved workability characteristics, which allow to obtain by drawing, moulding or calendering semi-finished products, and in particular treads, dimensionally stable and with a porosity index of less than 2%, quite acceptable for the subsequent uses.

According to a further aspect of this invention, a process for producing a tread with low rolling resistance for high-performance vehicle tires is provided, which is characterized in that it comprises the step of forming a rubber composition of vulcanizable rubber with a silica-based reinforcing filler and low carbon black content, obtainable by the process of the type described above.

The tread object of this invention is preferably obtained by drawing, moulding or calendering, at a temperature of from 80 to 120° C.

Thanks to the aforementioned advantageous features of homogeneity and low humidity content, the vulcanizable rubber composition of the invention can be drawn at a much higher speed than the maximum speed attainable by the silica-containing rubber compositions of the prior art.

The extruded tread obtainable in this way, advantageously possesses, besides the required low rolling resistance, a porosity degree—defined as $$[(d_m-d_t)/d_m] \times 100$$

wherein:

$d_m$=density of a sample of the rubber composition as such and subject to a compression treatment to remove any porosity from the same;

$d_t$=density of a sample of the rubber composition taken at the outlet of the drawing bench;

of from 0 to 2%.

Such value is fully compatible with the characteristics required to a tread when the latter is assembled in a tire structure to be vulcanized.

Besides, the tread according to the invention has a silica dispersion index such that the difference between said index and that of a substantially silica-free tread of the same composition (i.e. wherein all the silica has been replaced by carbon black) is less than 20,000.

In the following description and in the appended claims, the term "dispersion index", is intended to indicate a dimensionless numerical value, correlated to the roughness of the external surface of the semi-finished (for instance a tread) or finished (for in stance a tire) product considered.

The value of the above index can be measured by means of commercially available apparatuses, such as for instance the dispersion analyzer of FEDERAL (an ESTERLINE company), comprising a stylus which is caused to roll on the surface of the sample to be analyzed, and a device capable of recording and processing the shifts of the stylus at a right angle to said surface.

These shifts may be graphically shown by plotting the profile of the stylus displacement, which profile takes on the aspect of a broken line characterized by a succession of peaks, compared with a reference line with a different amplitude and frequency.

Obviously, a perfectly smooth surface would produce a straight line, while a "rough" surface produces a broken line, all the more irregular and indented the more numerous and different are the obstacles run into by the stylus during its path.

It is well known that a poor ingredient dispersion throughout a rubber composition produces, owing to vulcanization, a finished product with a surface full of microroughnesses, the more abundant and marked the worst is the dispersion.

The analyzer detects the number of peaks encountered by the stylus during a path of a prefixed length on the surface of the sample and converts them into a numerical value—defined here as "dispersion index"—correlated to the product of the square of the peaks frequency by the mean height of the peaks, wherein the peaks frequency is measured in peaks per cm, and the mean height of the peaks in micrometers.

According to a further aspect of the invention, a process is provided for the manufacture of tires for vehicle wheels, particularly suitable for the manufacture of high performance tires, provided with a tread containing a silica-based reinforcing filler, process of the type comprising the steps of preparing around the circumference of a carcass a tread externally provided with a rolling surface and linking by vulcanization said carcass to said tread, characterized in that said tread is obtained by forming a rubber composition obtainable according to a process described hereinabove.

According to a further aspect, this invention also refers to a tire for vehicle wheels whose tread, manufactured according to the process the invention, shows an optimal dispersion degree of the silica throughout the polymer base, so that the difference between said index and the dispersion index of a substantially silica-free tire of the same composition is smaller than 20,000.

Very surprisingly, tires manufactured according to the process of this invention, subject to road tests and compared with tires fully identical but incorporating a tread manufactured according to the prior art, have given much better results, as will be seen in the following.

While the phenomena involved have not been fully clarified as yet, one is led to think that the tire behaviour on road might be strongly affected not only by the presence of silica in the tread, but also by the way the silica has been incorporated into the polymer base.

Hence, according to a further aspect, this invention relates to a process to improve the road behaviour of tires, characterized in that the tire tread is obtained by submitting to forming a vulcanizable rubber composition obtainable by a process described hereinabove.

Further characteristics and advantages will be more readily apparent by the following description of some embodiments of the process for the preparation of vulcanizable rubber compositions according to the invention, as well as of the process for the manufacture of treads and tires provided with such treads.

The following examples are solely given by way of non limitative indication, reference being made to the attached drawing which shows a partly interrupted cross section of a tire according to the invention.

Figure 1:
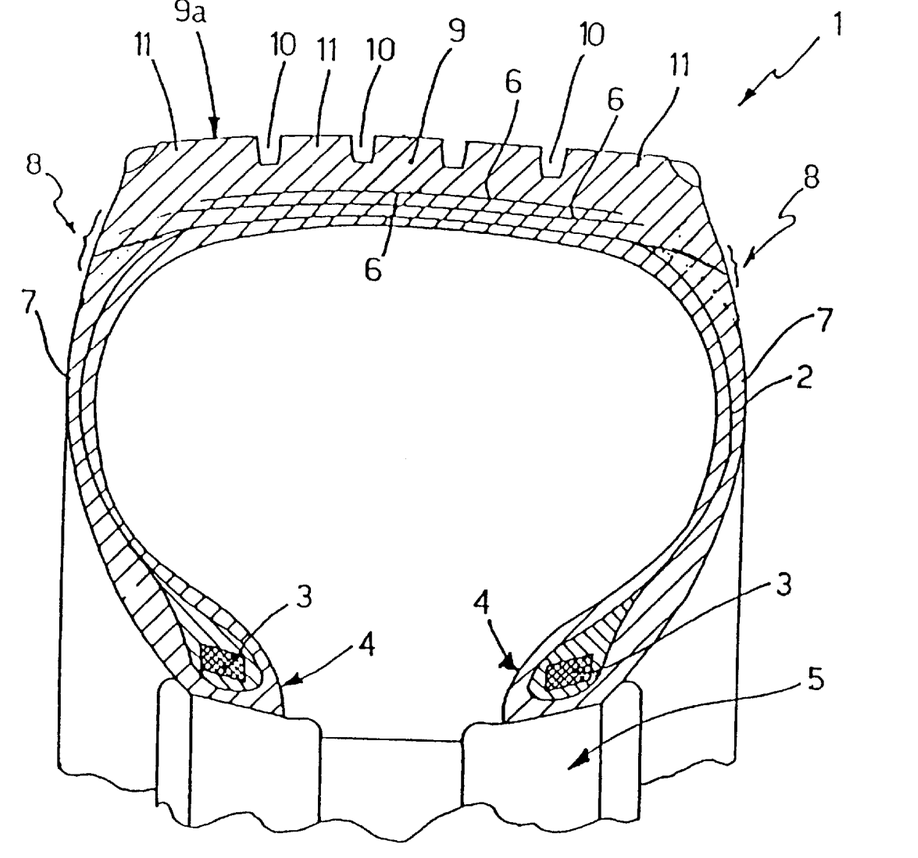

With reference to the above figure, a tire 1 comprises conventionally at least a carcass ply 2 whose opposed side edges are externally bent around bead wires 3, incorporated each in a bead 4, defined along an internal circumferential edge of the tire wherein the tire itself engages on a wheel rim 5.

Along the circumferential development of the carcass ply 2, one or more belt strips 6, made of textile or metal cords incorporated into a rubber composition sheet, are applied.

Externally to the carcass ply 2, in respective opposed side portions thereof, a couple of sidewalls 7 is applied, each of which extends from bead 4 up to a so-called "shoulder" zone 8 of the tire, defined in correspondence of opposed ends of the belt strips 6.

Onto the belt strips 6 a tread 9 is circumferentially applied whose side edges end in correspondence of the shoulders 8 joining with the sidewalls 7. Tread 9 has an external rolling surface 9a, designed to contact the ground, wherein circumferential grooves 10 may be obtained, intercalated by transversal grooves, not shown in the attached figure, which define a plurality of tread blocks 11 variously distributed along said rolling surface 9a.

The above described tire 1 may be manufactured by means of a process including a plurality of production steps which are quite conventional in themselves and known in the art.

More particularly, such process comprises the steps of preliminarly and independently preparing several semi-finished products corresponding to the different parts of the tire (carcass plies, belt strips, bead wires, fillings, sidewalls and treads), which are successively assembled to one another by a suitable assembling machine.

The subsequent vulcanization step then welds together the above semi-finished products to form a monolithic block, i.e. the tire.

Clearly, the step of preparing the above semi-finished products is preceded by a step of preparing and forming the corresponding rubber compositions.

In the tires of the invention, for instance those with low rolling resistance, the tread 9 —wherein the carbon black usually employed as reinforcing filler is partly or fully replaced by the silica or some other component suitable to improve the hysteretic characteristics of the tread—is produced by forming a vulcanizable rubber composition obtainable by the above described process.

Such process has allowed to overcome the already described process difficulties, as will be clearer from the following examples, given solely by way of non-limitative indication.

EXAMPLE 1

In a closed rotor mixer (Banbury) model F270 of the company POMINI, which had been caused to rotate at a speed of about 40 r.p.m., the following ingredients were charged in succession: 107 kg of E-SBR polymer base, 37 kg of carbon black, 32 kg of silica, 2 kg of zinc oxide, 1 kg of stearic acid, 2.5 kg of antioxidant, 1 kg of anti-fatigue agent, and 16 kg of aromatic oil as plasticizer, as well as other ingredients of common use in smaller quantities.

The characteristics of the ingredients employed were the following:

E-SBR=butadiene-styrene copolymer prepared in emulsion, having a styrene content of 23%;

carbon black=N115 type (Cabot Corporation);

silica=BET 175 m²/g, VN3 type (Degussa);

age-retarding agent=6PPD, also known as SANTOFLEX 13 (Monsanto);

anti-fatigue agent=TMQ, also known as VULCANOX 4020 (Bayer).

More particularly, the various ingredients were charged according to the following time sequence (times measured as from the rotors start up):

| polymer base, carbon black and silica | 15" |
|---|---|
| additives | 1'30" |
| plasticizer | 2' |

The ingredients of the rubber composition charged in this way were then throughly mixed for a further period of about 1'45", for an overall time span of this first step equal to about 3'45".

During the mixing operations, the mechanical work imparted to the rubber composition was controlled so as to keep its temperature within the range of about 165°–170° C.

In this way, 200 kg of a rubber composition were obtained in which the silica resulted to be homogeneously dispersed.

After cooling at ambient temperature, the rubber composition thus obtained was charged in a closed rotor mixer, type 11D, of the company POMINI, together with 2.35 kg of silane coupling agent Si69 [bis(3-triethoxysilyl-propyl) tetrasulfide] (DEGUSSA).

In this regard, it should be observed that when the silane coupling agent is in liquid form, such for example the Degussa agent Si69, the incorporation of the latter in the rubber composition may give rise to process difficulties which—in some cases—may worsen the quality of the finished product: in such a case, and in a known manner, it is preferable to load in the mixer a small quantity of an inert filler (such as for example carbon black or silica) together with the coupling agent, so as to facilitate the incorporation of the latter in the rubber composition.

In the alternative, use can be made of coupling agents provided in solid form, such as for example X50S by Degussa (50% carbon black, 50% silane), in a quantity which respects the values for each of the ingredients indicated hereinabove.

Also in this case, the rotors of the mixer were caused to rotate at about 40 r.p.m., so as to submit the rubber composition and the coupling agent to an intimate mixing, keeping the temperature of the composition at a value equal to about 135° C.

After about 2'30" 180 kg of a rubber composition were discharged, which were then recharged, after cooling at ambient temperature, together with 3.2 kg of a vulcanizing system comprising: sulphur 1 kg, diphenylguanidine DPG (Monsanto) 0.6 kg, SANTOCURE NS (Monsanto) 1.6 kg and vulcanization accelerators well known in the art, in the same closed rotor mixer (Banbury) model 11D of the company POMINI, which was caused to rotate at about 20 r.p.m.

The rubber composition was then submitted to intimate mixing, so as to disperse the vulcanizing system, taking care to keep the temperature of the composition at a value equal to about 100° C.

After about 3', 170 kg of a vulcanizable rubber composition were discharged, comprising in parts by weight:

| polymer base | 100 |
|---|---|
| carbon black | 35 |
| silica | 30 |
| coupling agent | 8% of silica |
| ZnO | 2 |
| stearic acid | 1 |
| antioxidants | 2.5 |
| antifatigue agents | 1.0 |
| plasticizers | 15 |
| sulfur | 1.2 |
| accelerators | 2.5 |

EXAMPLES 2–5

In accordance with the procedure described in the preceding Example 1, rubber compositions were prepared having the composition shown in Table I hereunder.

TABLE I

| Ingredients | Ex. 2 | Ex. 3 | Ex. 4 | Ex. 5 |
|---|---|---|---|---|
| S-SBR | 100 | — | — | 75 |
| E-SBR | — | 75 | 75 | — |
| NR | — | 25 | — | — |
| BR | — | — | 25 | 25 |
| carbon black | 20 | 50 | 40 | 20 |
| silica | 50 | 15 | 20 | 50 |
| coupling agent | 5 | 1.5 | 2 | 5 |
| ZnO | 2 | 2 | 2 | 2 |
| Stearic acid | 1 | 1 | 1 | 1 |
| antioxidants | 2.5 | 2.5 | 2.5 | 2.5 |
| sulfur | 1.5 | 1.5 | 1.5 | 1.5 |
| accelerators | 2 | 2 | 2 | 2 |

S-SBR = butadiene-styrene copolymer prepared in solution, having a styrene content of 26%, a content of 1.4-trans bonds of 22% and of vinyl groups of 60%;
NR = natural rubber;
BR = polybutadiene, having a content of 1.4-cis bonds equal to 93%
Other ingredients: as in Example 1.

EXAMPLE 6

A rubber composition having the same composition of the preceding Example 1 was prepared by simultaneously performing the steps of adding and mixing the coupling agent and the vulcanization system into the rubber composition incorporating silica.

In this case, the temperature in the final mixing step was kept at a value equal to about 110° C., so as to avoid any early vulcanization of the rubber composition.

EXAMPLE 7

A rubber composition having the same composition of the preceding Example 1 was prepared by performing the mixing of the coupling agent just at the end of the first mixing step, without discharging the rubber composition from the Banbury.

However, the temperature of the rubber composition was decreased to about 140° C. at the end of the first step, gradually reducing the mechanical work to which the rubber composition was submitted by the Banbury rotors.

In this case, the overall time span of the two steps was equal to about 6'.

The subsequent step of incorporating the vulcanizing system was performed according to the method of Example 1.

EXAMPLE 8

(Comparison)

With the same quantities and the same ingredients used in Example 1, a first comparison rubber composition was prepared by means of a preparation process according to the prior art.

More particularly, all the ingredients, except for sulphur and the vulcanization accelerators, were charged into a Banbury model F270 of the company POMINI, which was caused to rotate at about 40 r.p.m.

Because of the simultaneous presence of the silica and of the coupling agent, the temperature of the composition was kept at a value equal to about 160° C. during the mixing operations which lasted about 3'.

The vulcanizing system was then added to the rubber composition thus obtained, and the whole was subjected to mixing in a Banbury model 11D of the company POMINI, which was caused to rotate at about 20 r.p.m.

Also in this case, the temperature of the composition was kept at a value of about 100° C., lower than the vulcanization temperature, during the mixing operations which lasted about 2'.

EXAMPLE 9

(Comparison)

According to traditional methods known per se, a second comparison rubber composition was prepared, including—as reinforcing filler—only carbon black, having the following composition in parts by weight:

| | |
|---|---|
| polymer base (E-SBR) | 100 |
| carbon black | 68.0 |
| ZnO | 2.0 |
| stearic acid | 10 |
| antioxidants | 2.5 |
| anti-fatigue agents | 1.9 |
| plasticizers | 2.4 |
| sulfur | 1.2 |
| accelerators | 1.8 |

EXAMPLE 10

Several batches of rubber compositions according to each of the preceding examples 1, 8 and 9, were produced at subsequent times, each batch being constituted by 15/20 charges.

From each charge a sample was then taken, and submitted thereafter to vulcanization, according to a method and with apparatuses known in the art, and thereafter to several tests, to determine, within each batch and for all the batches, the variation coefficients of some parameters of particular significance.

Such parameters were:

volumic mass ($m_v$): measured according to ISO standard 2751;

modulus of elasticity at 100% elongation (CA1): measured according to ISO standard 37 (ring test piece);

modulus of elasticity at 300% elongation (CA3) measured according to ISO standard 37 (ring test piece);

strength at break: measured according to ISO standard 37 (ring test piece);

hardness: measured according to ISO standard 48.

Table II hereunder shows the results of the tests carried out, expressed as variation coefficients, that were the smaller the smaller the variability of the coefficients measured within each production batch.

TABLE II

AVERAGE VALUES OF VARIATION COEFFICIENTS

| compos. | Batch Nos. | $m_v$ | CA1 | CA3 | CR | Hard. |
|---|---|---|---|---|---|---|
| Ex. 1 | 6 | 0.10 | 2.33 | 2.52 | 5.50 | 0.70 |
| Ex. 8 | 10 | 0.29 | 6.21 | 5.24 | 6.13 | 1.86 |
| Ex. 9 | 17 | 0.23 | 4.47 | 4.94 | 4.83 | 2.00 |

EXAMPLE 11

(Evaluation of silica dispersion index)

The rubber compositions obtained according to the preceding examples 1, 6, 8 and 9 were submitted to drawing for preparing treads for vehicle tires, according to a method and with apparatuses known in the art.

From the treads of the (vulcanized) tires thus obtained, samples were taken, which were then submitted to several tests in order to determine the silica dispersion index.

In the tests, carried out by means of the aforementioned dispersion analyzer of the company FEDERAL, the reference values taken were those measured on tread samples obtained starting from the silica-free rubber composition of the preceding Example 9.

The analyzer used for the test detected the number of peaks encountered by the stylus during a path of a length equal to 14.25 mm.

Table III hereunder shows the dispersion indexes of tread samples obtained from the rubber compositions of Examples 1 and 6 (according to the invention), from rubber composition 8 (produced with the process of the prior art), and from rubber composition 9 (silica-free). These last samples were taken as references.

In order to indicate the dispersion of the ingredients, and that of the silica in particular, the first column shows the value of the dispersion index as recorded by the analyzer, the second column shows said value cleaned from the "ground noise" constituted by the roughness of the silica-free samples, highlighting in this way, by difference of the two values, the dispersion degree of the silica in the rubber compositions compared.

It may be easily observed that the difference between the dispersion index of the silica-containing rubber composition and. that of the same rubber composition wherein all the silica was replaced by carbon black is always smaller than 20,000.

TABLE III

SILICA DISPERSION INDEX

| Rubber comp. | as such | only silica* |
|---|---|---|
| Ex. 1 | 28,869.3 | 11,668.0 |
| Ex. 6 | 33,283.7 | 16,082.3 |
| Ex. 8 | 38,259.0 | 21,057.7 |
| Ex. 9 | 17,201.3 | — |

*= numerical data referred to values measured on silica-free samples (rubber composition of Example 9).

Since the silica dispersion index is the greater the worst is the dispersion of the silica thoughout the tested rubber composition, the drastic improvements achieved by the invention as compared to the prior art are immediately evident from the above data.

EXAMPLE 12

Road Behaviour

With the rubber compositions obtained according to the preceding Examples 1, 6 and 8, several treads were produced by drawing in conventional apparatuses, which treads were then assembled on to 235/40–18 size tires.

According to the invention, the rubber compositions of Examples 1 and 6 were drawn at a speed of about 21 m/min, producing treads having a porosity equal to about 2%, while with the rubber composition of Example 8 (prior art) drawing speeds lower by 30% (14.7 m/min) had to be adopted.

In spite of speed reduction, about 20% of the treads had to be discarded, due to the lack of conformity to the fixed geometric requirements.

The tires so obtained were then submitted to standard tests, in order to evaluate their road behaviour.

In all the tests performed, the tires incorporating a tread manufactured with the rubber compositions of this invention were evaluated taking as a reference the tires manufactured with the rubber compositions of Example 8.

At the end of each test, a rate from 0 to 10 was assigned by the test driver to each of the evaluation parameters examined.

Tables IV and V show the results so obtained, expressed as average values of the evaluations made by two different test drivers.

TABLE IV

Tests on dry ground

| Parameters | Ex. 1 | Ex. 6 | Ex. 8 |
| --- | --- | --- | --- |
| effort at steering wheel | 6 | 5.5 | 4.5 |
| gearing promptness | 5 | 5 | 4 |
| transversal compliance | 6.5 | 6 | 4 |
| curve release | 6.5 | 6 | 3.5 |
| straightaway stability | 6.5 | 6 | 4 |

TABLE V

Tests on wet ground

| Parameters | Ex. 1 | Ex. 6 | Ex. 8 |
| --- | --- | --- | --- |
| curve stability (oversteering) | 7.5 | 6 | 5 |
| curve stability (understeering) | 7.5 | 6 | 4.5 |
| straightaway stability | 7 | 6 | 4.5 |
| aquaplaning | 7.5 | 6 | 5 |
| curve holding | 7 | 6 | 5 |

As can be observed from the above tables, the tires of the invention have performed markedly better with respect to the tires manufactured according to the prior art.

More particularly, a marked improvement was noticed as concerns transversal compliance, curve holding and release characteristics and straightaway stability both on dry and on wet ground.

From what was described and illustrated above it may be easily appreciated the various advantages achieved by the present invention, such as:

a) improved silica dispersion throughout the rubber composition and in the products obtainable therefrom;

b) low humidity content of the rubber composition, with ensuing possibility of drastically increasing the drawing speed of the same, as well as to improve the production capacity of plants;

c) highly reproducible and constant values of the physico-mechanical characteristics of the rubber compositions and the products obtainable therefrom;

d) improved road behaviour of tires, in particular on wet ground.

Obviously, those skilled in the art may introduce variants and modifications to the above described invention, in order to satisfy specific and contingent requirements, variants and modifications which fall anyhow within the scope of protection as is defined in the following claims.

We claim:

1. A tire for vehicles, comprising:
a carcass ply (2) anchored at opposite edges to a couple of bead wires (3), incorporated each in corresponding beads (4) defined along internal circumferential edges of said tire (1);
a belt strip (6) extending circumferentially around said carcass ply (2);
a tread (9) circumferentially placed around said belt strip (6) and having externally a rolling surface (9a) for rolling on the ground,
wherein said tread (9) consists essentially of a vulcanized rubber composition comprising a silica-based reinforcing filler dispersed throughout a polymer base and having a silica dispersion index such that the difference between said index and the dispersion index of a substantially silica-free tread of the otherwise same composition as said vulcanized rubber composition is less than 20,000.

2. The tire according to claim 1, wherein said vulcanized rubber composition is made from a cross-linkable unsaturated chain polymer base and comprises 10 to 80 parts by weight of said reinforcing filler per each 100 parts by weight of said cross-linkable unsaturated chain polymer base.

3. The tire according to claim 2, wherein said cross-linkable unsaturated chain polymer base comprises a first member selected from the group consisting of: natural rubber, 1,4-cis polybutadiene, polychloroprene, and 1,4-cis polyisoprene and mixtures thereof, and optionally a second member selected from the group consisting of: halogenated isopreneisobutene copolymers, butadiene-acrylonitrile, styrene-butadiene and styrene-butadieneisoprene terpolymers, either prepared in solution or in emulsion, ethylene-propylene-diene terpolymers and mixtures thereof.

4. A tread with low rolling resistance for vehicle tires consisting essentially of a vulcanized rubber composition comprising a silica-based reinforcing filler dispersed throughout a polymer base and having a silica dispersion index such that the difference between said index and the dispersion index of the otherwise same composition as said vulcanized rubber composition is less than 20,000.

5. The tread according to claim 4, wherein said vulcanized rubber composition is obtained from a cross-linkable unsaturated chain polymer base and comprises 10 to 80 parts by weight of said reinforcing filler per each 100 parts by weight of said cross-linkable unsaturated chain polymer base.

6. The tread according to claim 5, wherein said cross-linkable unsaturated chain polymer base comprises a first member selected from the group consisting of: natural rubber, 1,4-cis polybutadiene, polychloroprene, and 1,4-cis polyisoprene and mixtures thereof, and optionally a second member selected from the group consisting of: halogenated isopreneisobutene copolymers, butadiene-acrylonitrile, styrene-butadiene and styrene-butadieneisoprene terpolymers, either prepared in solution or in emulsion, ethylene-propylene-diene terpolymers and mixtures thereof.

7. Method of controlling the road hold of high performance tires, in particular tires with low rolling resistance, said tires comprising a carcass ply (2) anchored at opposite edges to a couple of bead wires (3), incorporated each in corresponding heads (4) defined along internal circumferential edges of said tires, with a belt strip (6) extending circumferentially around said carcass ply (2) and with a tread (9) circumferentially placed around said belt strip (6), said tread (9) comprising at least a silica-based reinforcing filler and having externally a rolling surface (9a) for rolling on the ground, wherein said tread (9) consists essentially of a vulcanized rubber composition comprising a silica-based reinforcing filler dispersed throughout a polymer base and having a silica dispersion index such that the difference between said index and the dispersion index of a substantially silica-free tread of the same composition is smaller than 20,000.

* * * * *